March 31, 1925. 1,531,739
G. W. DENISON
SYSTEM AND APPARATUS FOR TRAFFICKING TILE DURING MANUFACTURING
Filed March 31, 1924   2 Sheets-Sheet 1
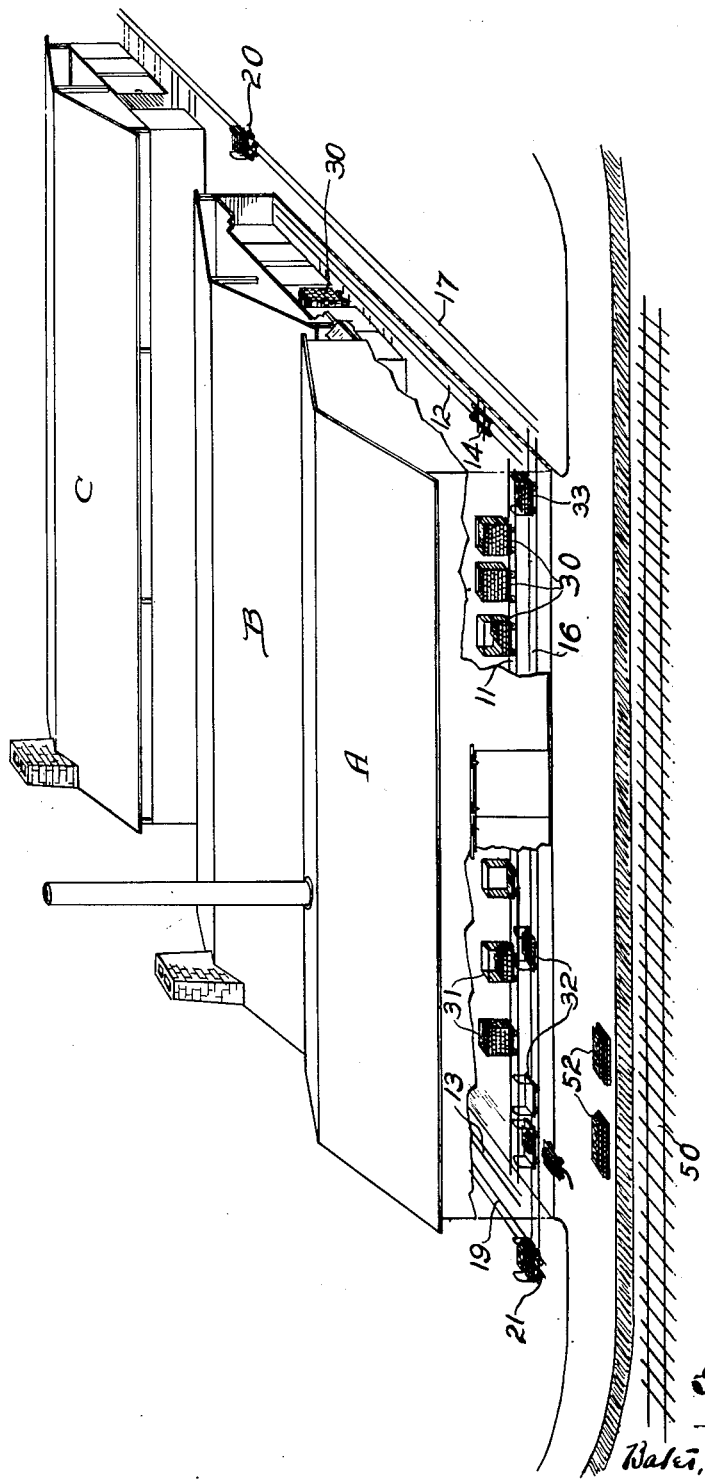

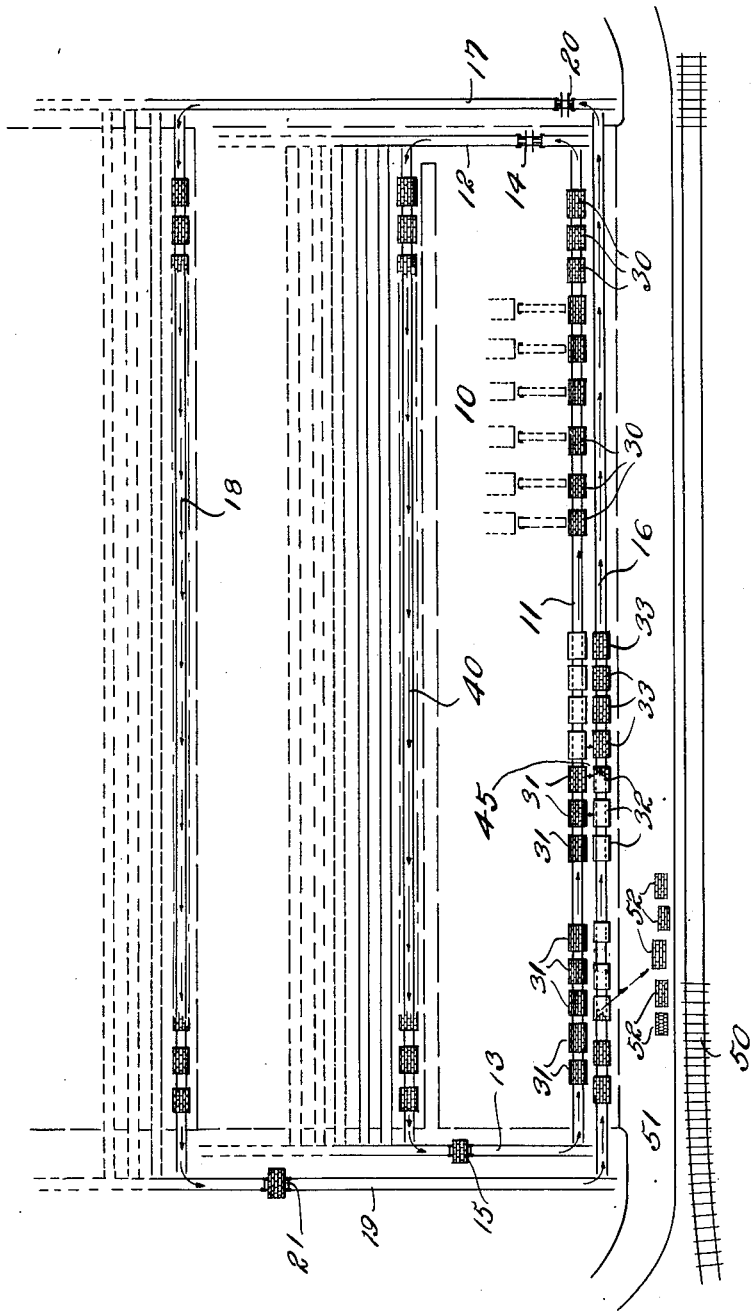

Patented Mar. 31, 1925.

1,531,739

UNITED STATES PATENT OFFICE.

GEORGE W. DENISON, OF BAY VILLAGE, OHIO.

SYSTEM AND APPARATUS FOR TRAFFICKING TILE DURING MANUFACTURING.

Application filed March 31, 1924. Serial No. 703,077.

*To all whom it may concern:*

Be it known that I, GEORGE W. DENISON, a citizen of the United States, residing at Bay Village, in the county of Cuyahoga and State of Ohio, have invented a certain new and useful Improvement in a System and Apparatus for Trafficking Tile During Manufacturing, of which the following is a full, clear, and exact description, reference being had to the accompanying drawings.

This invention is concerned with the obtaining of efficiency in the trafficking of brick and tile at the source of manufacture.

The general object of my invention is directed to the provision of a novel method of routing the movement of tile or brick about a ceramic plant during the pressing, drying and burning periods thereof, whereby the maximum amount of the product may be efficiently handled while involving the use of a minimum investment in traffic equipment and building space.

A further object of my invention is the provision of a tracking kiln arrangement for promoting the efficient use of tile or brick carrying trucks which carry the product after being preliminarily formed through drying and burning periods, the arrangement being such that the plant capacity may be increased from time to time without in any way interfering with or necessitating the re-arrangement of the trafficking equipment.

Other objects of my invention will be hereinafter set forth in the following description which refers to the accompanying drawings illustrating a plant layout adaptable for fulfilling the steps in my novel method of routing tile or brick in a ceramic plant. The essential characteristics are summarized in the claims.

In the drawings, Fig. 1 is a perspective view of a ceramic plant embodying apparatus for carrying out the steps in my method of handling tile and brick; Fig. 2 is a plan view illustrating the track and kiln arrangement of a plant such as is shown in Fig. 1.

The modern development of continuous drying and burning processes in ceramic manufacturing has presented new problems in the form of congestion in plant traffic and heavy investment in transportation equipment adaptable for carrying the tile or brick to the continuously operated burning kilns. The solution of this problem, in a simple manner, is somewhat complicated by the fact that experience has shown that the most efficient manner of loading a truck with the green product to transport it through the drying kiln is not the most efficient manner of loading a truck with the dry product preparatory to transporting it through the burning kiln. Hence the development of the particular types of trucks for carrying the product through the continuously operated drying kiln is different than an economically designed truck adaptable for use in a burning kiln due to the higher prevailing temperatures in the latter and to the difference in the manner of stacking the product upon the trucks. Neither would a solution of the problem be obtained by loading a truck but once, namely with green material, passing it through the drier and then without unloading, passing it through the burning kiln. This would involve the use of a more expensive type of truck, namely the burning kiln truck for drying purposes. Apart from the fact that this would also involve burning the uninspected dried product with its percentage of breakage. I have found that by properly analyzing the routing of the green and dried material, it is possible to obtain the full benefit available upon the installation of continuously operated drier and burning kilns in that by installing two drier kilns, I may maintain the efficient operation of one burning kiln to full capacity. For the drier kiln, I provide a cheaper type of truck than the type of truck which experience has shown is necessary for the burning kiln.

It will be understood that, due to the fact that the artificial drying of the green product necessitates the loading of the truck with this green product to a less extent than when the product is dried, a great many more drier trucks than there are burning trucks, will be required. I find, for instance, a considerable saving may be effected by unloading the contents of five drier trucks and restacking these loads upon a single burning truck.

To carry out the foregoing plan and to obtain the full efficiency thereof, I find that it is important that the drying and burning kilns and the extruding and cutting machines be arranged in a particular manner, and in this arrangement, I also make provision for unforeseen or contemplated increases in plant capacity to meet the requirements of business expansion.

The particular manner in which I arrange the primary elements, which are essential to all ceramic plants, is controlled to a certain extent by the contemplated initial building investment and to a certain extent by an efficient arrangement of yard or plant tracks for the trucks whereby all confusion in the handling of the trucks may be eliminated. I find that by routing the green material in a closed cycle and the dried material along a circumscribing route that I obtain a trackage layout which results in a considerable saving in the initially involved investment in transportation equipment and in the saving of building space while being sufficiently flexible to be readily adaptable to future expansion of the plant capacity.

As shown in Fig. 1 of the drawings, I arrange the building A, housing the forming machinery, such as the extruding machines and cutting machines, adjacent to and parallel with building B, housing one or more continuous drying kilns and parallel with the drying kiln house B, I arrange the burning kiln house C containing one or more continuous burning kilns. As shown in Fig. 2, the extruding and cutting machines 10 are arranged at one end of the building A, and extending longitudinally of this building, I arrange a truck track 11 which passes adjacent the ends of the conveyers of the cutting machines. At each end of the building A, I provide transverse tracks 12 and 13 which may comprise a continuation of the track 11, or as shown may comprise a road for transfer trucks 14 and 15 whereby the green product carrying trucks on the track 11 may be transferred to the drying kiln track 40. Extending parallel with the described tracks are tracks 16, 17, 18 and 19, the tracks 17 and 19 comprising roads for transfer trucks 20 and 21 respectively, for transferring dried product carrying trucks from the tracks 16 to the burning kiln tracks 18, and return.

As shown in the drawings, the inner series of tracks comprises a path for carrying the green and dried material while the outer set of tracks are arranged independently thereof and comprise a path for trucks carrying the dried and burnt product.

As the product is extruded and cut by the machines 10, it is loaded upon drier trucks 30, each truck being immediately transferred to drying kiln track 40 by transfer truck 14 when loaded to capacity. It will be seen that upon the disposition of a truck carrying green brick or tile within the drying kiln, a truck of dried product will be available at the opposite end of the kiln house B. This truck may be returned to the track 11 by the transfer truck 15 but at the end of the house A remote from the extruding machines 10, the trucks 31 being representative of loads of returned dried product. As shown in Fig. 2, a sufficient number of these trucks of loaded dry material are always available whereby they may stand through a sufficient period to permit the cooling of the product to a sufficiently low temperature to be manually handled whereupon the product is transferred manually to adjacent burning kiln trucks 32.

The burning kiln trucks, of course, have a greater capacity than the drying kiln trucks, due to the fact that the product after being thoroughly dried is capable of withstanding a greater stacking load and are accordingly, so loaded. The loaded trucks 33, carrying the restacked dried product may be run to the end of the house A and then upon a transfer car 20, whence they may be transported to the burning kiln track 18 and as hereinbefore stated with reference to the drying kiln, when a new car of product is inserted or placed in one end of the burning kiln, a truckload of the burnt product will be available at the opposite end of the house C. This truck may be returned to the track 16 upon the transfer car 21 and after a sufficient cooling period the finished product may be unloaded therefrom to a railroad car standing on a standard gauge track 50 or to a road vehicle positioned in the drive way 51 or may be stacked in storage piles as indicated at 52. It will be seen that I may dispense with a double track at each end of the plant for separate transfer cars and use but one track and transfer truck. This arrangement of course I would consider within the scope of my invention, in which case the respective positions of the drying kiln and burning kiln may be reversed without resulting traffic confusion.

From the foregoing description, it will be obvious that a plant arranged in the manner herein described is susceptible of considerable capacity expansion without necessitating the provision of additional buildings without involving an unnecessary increase in internal transportation or a re-arrangement of the routing of the material. If it is desired to increase the capacity of the plant, additional extruding and cutting machines may be installed in the house A adjacent the present equipment. The traffic condition of the tracks 11 and 16 is a barometer of the amount of dried and burnt product at any given time. This has the advantage of indicating to the working force the amount of finished product which is to be stored or shipped to afford trackage for other burnt product turned out when only the kilns are in operation over a week end or holiday. Furthermore if shipping should cease for a day or so due to the lack of railroad cars or road vehicles the plant could continue its operation but the loaded drier trucks and burnt product trucks would be unloaded at a point closer to the extruding machines.

Additional trucks may be provided on the track 11 and a double track drying kiln and a single track burning kiln may be constructed adjacent the installed kilns in the houses B and C respectively and the routing of the material in the manner described may be continued.

It will be also obvious that by having the route of the burning kiln trucks arranged independently of the route of the drying kiln trucks, a more economical type of truck may be used for the drying kilns than the type of truck used for the burning kilns without resulting in confusion and that the system will be sufficiently flexible to permit variations in the number of loaded or empty trucks on either track 11 or track 16 without causing a cessation in the operation of the extruding and cutting machines in the house A. Furthermore it will be seen that the nature of the arrangement is such that the maximum amount of equipment may be arranged in a minimum building space.

I claim:

1. In a plant for manufacturing ceramic products the combination of a closed cycle of trackage, said cycle including tracks whereby trucks carrying the product may traverse a drying oven, and parallel stretches of tracks whereby the dried product carried by trucks on one track may be transferred to trucks on another track, the routing of which circumscribes the path of the first track and which includes a stretch of track traversing a burning oven.

2. In a ceramic plant adapted to the manufacture of brick and tile, the combination of a burning kiln of the car tunnel type, a drying kiln of the same type, a stretch of truck tracks extending through each kiln, a plurality of trucks for transporting green ware through the drying kiln, a plurality of trucks of a different capacity than the drying kiln trucks for transporting the dried product through the burning kiln, a stretch of track disposed exteriorly of both kilns for receiving drying kiln trucks loaded with dried product, a second track extending substantially parallel to said receiving track for receiving trucks loaded with finished product and transfer tracks disposed at the ends of the burning and drying kilns for transferring the burning and drying kiln trucks to and from said parallel tracks and from and to the kilns.

3. In a ceramic plant adapted to the manufacture of brick and tile, the combination of a burning kiln of the car tunnel type, a drying kiln of the same type arranged to extend parallel thereto, a stretch of truck tracks extending through each kiln, a plurality of trucks for transporting green ware through the drying kiln, a plurality of trucks for transporting the dried product through the burning kiln, stretches of track disposed exteriorly of both kilns for receiving drying kiln trucks loaded with dried product, and trucks loaded with finished product and truck transfer means disposed at the ends of the burning and drying kilns for transferring the burning and drying kiln trucks to and from said stretches of tracks.

4. In a ceramic plant adapted to the manufacture of brick and tile, the combination of a burning kiln of the car tunnel type, a drying kiln of the same type constructed to extend parallel to the burning kiln, a stretch of truck tracks extending through each kiln, a plurality of trucks for transporting green ware through the drying kiln, a plurality of trucks of a different capacity than the drying kiln trucks for transporting the dried product through the burning kiln, a stretch of track disposed exteriorly of both kilns for receiving drying kiln trucks loaded with dried product, a second track extending substantially parallel to said receiving track for receiving trucks loaded with finished product and transfer cars traversing the ends of the burning and drying kilns for transferring the burning and drying kiln trucks to and from said parallel tracks and from and to the kilns.

5. In a ceramic plant adapted to the manufacture of brick and tile, the combination of a burning kiln of the car tunnel type, a drying kiln of the same type, a stretch of truck tracks extending through each kiln, a plurality of trucks for transporting green ware through the drying kiln, trucks for transporting the dried product through the burning kiln, a stretch of track disposed exteriorly of both kilns for receiving burning kiln trucks loaded with finished product, a second track for receiving trucks loaded with dried product, said second track being disposed between the kilns and said first named receiving track, and transfer tracks disposed at the ends of the burning and drying kilns for transferring the burning and drying kiln trucks to and from said parallel tracks and from and to the kilns.

6. In a ceramic plant adapted to the manufacture of brick and tile, the combination of a burning kiln of the car tunnel type, a drying kiln of the same type, a stretch of truck tracks extending through each kiln, a plurality of trucks for transporting green ware through the drying kiln, a plurality of trucks of a different capacity than the drying kiln trucks for transporting the dried product through the burning kiln, a stretch of track disposed exteriorly of both kilns and parallel thereto for receiving burning kiln trucks loaded with finished product, a second track extending substantially parallel to said receiving track for receiving trucks loaded with dried product, said second track being disposed between the kilns and said first named receiving track and transfer tracks disposed at the ends of the burning and drying kilns for transferring the burning and drying kiln trucks to and from said parallel tracks and to the kilns.

7. In a ceramic plant adapted to the manufacture of brick and tile, the combination of a burning kiln of the car tunnel type, a drying kiln of the same type, a stretch of truck tracks extending through each kiln, a plurality of trucks for transporting green ware through the drying kiln, a plurality of trucks of a different capacity than the drying kiln trucks for transporting the dried product through the burning kiln, a stretch of track disposed exteriorly of both kilns for receiving drying kiln trucks loaded with dried product, a second track extending substantially parallel to said receiving track for receiving trucks loaded with finished product and separate transfer tracks disposed at the ends of the burning and drying kilns for transferring the burning and drying kiln trucks to and from said parallel tracks.

8. In a ceramic plant adapted to the manufacture of brick and tile, a product transporting system comprising in combination a plurality of truck tracks placed in sets circumscribing the extruding department of the plant and arranged whereby one set will lie circumadjacent an inner set, a portion of the inner set of tracks extending through a drying kiln, a portion of the outer or circumadjacent set of tracks being arranged to extend through a burning kiln, tile transporting means arranged to move in closed cycles on said inner set of tracks, other tile transporting means arranged to move in closed cycles on said circumadjacent set of tracks, the relation of portions of each set being such that the tile carried on the transporting means traversing the inner set of tracks may be manually transferred to the tile transporting means traversing the outer set of tracks.

9. In a ceramic plant adapted to the manufacture of brick and tiles, a product transporting arrangement comprising in combination a plurality of parallel truck tracks arranged in sets whereby one set will lie circumadjacent an inner set, a drying kiln covering a portion, a burning kiln of the inner set of tracks covering a portion of the outer circumadjacent set of tracks, a plurality of trucks arranged to move on said inner set of tracks, and a plurality of trucks arranged to move on said circumadjacent set of tracks, the disposition of portions of each set being such that the tile being transported on the inner set of tracks may be manually transferred to trucks traversing the outer set of tracks.

10. In a ceramic plant adapted to the manufacture of brick and tiles, a product transporting arrangement comprising in combination a plurality of truck tracks arranged in sets whereby one set will circumscribe an inner set, a portion of the inner set of tracks being arranged to extend through a drying kiln, a portion of the outer circumadjacent set of tracks being arranged to extend through a burning kiln, a plurality of individually movable trucks arranged to move on said inner set of tracks and a plurality of trucks individually movable on said circumadjacent set of tracks, the position of portions of each set being such that the tile carried on the trucks traversing the inner set of tracks may be manually transferred to the trucks traversing the outer set of tracks.

11. In a tile and brick manufacturing plant, the combination of a continuously operated drying kiln including a truck track extending therethrough, a continuously operated burning kiln having truck tracks extending therethrough. each of the tracks comprising portions of sets of parallel tracks, one set being arranged inside of the other and tile transporting trucks for each set of tracks whereby movement of the product on the inner track may be effected without necessitating movement of product traversing the outer track.

12. In a tile and brick manufacturing plant, the combination of a continuously operated drying kiln including a truck track extending therethrough, a continuously operated burning kiln having a truck track extending therethrough, said tracks being arranged in parallel relation and comprising portions of independent sets of tracks, one set being arranged inside of the other and a plurality of trucks traversing each set of tracks.

13. In a tile and brick manufacturing plant, the combination of a continuously operated drying kiln including a truck track extending therethrough, a continuously operated burning kiln having a truck track extending therethrough, each of the tracks comprising portions of sets of tracks, one set being arranged inside of the other and a plurality of trucks arranged to traverse each set of tracks in a common direction when moving through the baking and burning kilns.

In testimony whereof, I hereunto affix my signature.

GEORGE W. DENISON.